(12) United States Patent
Hussain et al.

(10) Patent No.: US 11,093,257 B2
(45) Date of Patent: Aug. 17, 2021

(54) RESOURCE CONFIGURATION BASED ON DYNAMIC GROUP MEMBERSHIP

(71) Applicant: Amazon Technologies, Inc., Seattle, WA (US)

(72) Inventors: Amjad Hussain, Bellevue, WA (US); Anand Doshi, Bellevue, WA (US); Xiong Wang, Redmond, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/723,562

(22) Filed: Dec. 20, 2019

(65) Prior Publication Data

US 2020/0125370 A1    Apr. 23, 2020

Related U.S. Application Data

(63) Continuation of application No. 15/276,700, filed on Sep. 26, 2016, now Pat. No. 10,514,932.

(51) Int. Cl.
*G06F 15/177* (2006.01)
*G06F 9/4401* (2018.01)
*G06F 9/50* (2006.01)

(52) U.S. Cl.
CPC .......... *G06F 9/4411* (2013.01); *G06F 9/4405* (2013.01); *G06F 9/5061* (2013.01)

(58) Field of Classification Search
None
See application file for complete search history.

(56) References Cited

U.S. PATENT DOCUMENTS 7,743,008 B2    6/2010   D'Alo et al.
8,713,207 B2    4/2014   Wright et al.
(Continued)

FOREIGN PATENT DOCUMENTS

EP    2439687         4/2012
EP    2439687 A1 *   4/2012   ......... G06Q 10/0631
WO   2016126731      8/2016

OTHER PUBLICATIONS

Jeff Barr, "New EC2 Run Command—Remote Instance Management at Scale", Retrieved from URL: https://aws.amazon.com/blogs/aws/newec2runcommandremoteinstancemanagementatscale/ on Sep. 26, 2016, pp. 1-9.

(Continued)

*Primary Examiner* — Phyllis A Book
(74) *Attorney, Agent, or Firm* — Robert C. Kowert; Kowert, Hood, Munyon, Rankin & Goetzel, P.C.

(57) ABSTRACT

Methods, systems, and computer-readable media for resource configuration based on dynamic group membership are disclosed. An association between a group of computing resources and an intended state is stored. The intended state represents a computing resource configuration. During operation of a computing resource, whether the computing resource belongs to the group of computing resources is determined based at least in part on analysis of one or more attributes associated with the computing resource. Based at least in part on determining that the computing resource belongs to the group of computing resources, one or more actions are caused be performed to bring the computing resource into the intended state. The computing resource is executed while having the computing resource configuration represented by the intended state.

20 Claims, 8 Drawing Sheets

(56) References Cited

U.S. PATENT DOCUMENTS

| | | | |
|---|---|---|---|
| 8,769,102 | B1 | 7/2014 | Zhou et al. |
| 8,825,834 | B2 | 9/2014 | Black-Ziegelbein et al. |
| 8,832,774 | B2 | 9/2014 | Nestler et al. |
| 9,154,589 | B1 | 10/2015 | Klein et al. |
| 10,514,932 | B2 | 12/2019 | Hussain et al. |
| 2003/0105993 | A1* | 6/2003 | Colrain .............. G06F 9/5061 714/39 |
| 2005/0182582 | A1 | 8/2005 | Chen |
| 2008/0052711 | A1* | 2/2008 | Forin ................ G06Q 10/10 718/100 |
| 2008/0216081 | A1 | 9/2008 | Jackson |
| 2013/0046874 | A1* | 2/2013 | Cohn ................. H04L 41/00 709/223 |
| 2013/0124267 | A1 | 5/2013 | O'Sullivan et al. |
| 2013/0232164 | A1* | 9/2013 | Bigney ............. G06F 9/5061 707/769 |
| 2013/0283176 | A1 | 10/2013 | Hoole et al. |
| 2014/0047117 | A1 | 2/2014 | Jensen-Horne et al. |
| 2014/0101400 | A1* | 4/2014 | Craddock .......... G06F 9/30003 711/162 |
| 2015/0033305 | A1 | 1/2015 | Shear et al. |
| 2015/0154055 | A1* | 6/2015 | Branson ............. G06F 9/5061 718/104 |
| 2015/0269117 | A1* | 9/2015 | Gainey, Jr. .......... G06F 9/30076 713/2 |
| 2016/0164738 | A1* | 6/2016 | Pinski ............... H04L 43/0888 709/224 |
| 2016/0170792 | A1 | 6/2016 | Kato |
| 2016/0218938 | A1* | 7/2016 | Gupte ................ G06F 9/5072 |
| 2016/0239595 | A1 | 8/2016 | Maes et al. |
| 2017/0093872 | A1 | 3/2017 | Braksator et al. |
| 2018/0089299 | A1 | 3/2018 | Collins et al. |

OTHER PUBLICATIONS

Jeff Barr, "Auto Scaling Update—New Scaling Policies for More Responsive Scaling", Retrieved from URL: https://aws.amazon.com/blogs/aws/autoscalingupdatenewscalingpoliciesformorerespon sivescaling/ on Sep. 26, 2016, pp. 1-6.

Jeff Barr, "Auto Scaling Update—Lifecycle Mangement, Standby State, and DetachInstances", Retrieved from URL: https://aws.amazon.com/blogs/aws/autoscalingupdatelifecyclestandbydetach/ on Sep. 26, 2016, pp. 1-5.

International Search Report and Written Opinion from PCT/US2017/053433, dated Dec. 19, 2017, Amazon Technologies, Inc., pp. 1-11.

\* cited by examiner

RESOURCE CONFIGURATION BASED ON DYNAMIC GROUP MEMBERSHIP

This application is a continuation of U.S. patent application Ser. No. 15/276,700, filed Sep. 26, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more intermediate networks). Distributed systems housing significant numbers of interconnected computing systems have become commonplace. Such distributed systems may include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for resource configuration based on dynamic group membership are described. Using the techniques described herein, computing resources such as compute instances may be automatically and dynamically configured at launch according to their group memberships, and the group memberships may also be automatically and dynamically determined at launch. Administrators may define intended states (i.e., policy-based configurations) of computing resources and associate those intended states with groups of resources. When a new resource is launched or instantiated, a computing resource management service may automatically determine whether the new resource belongs to a group; if so, the service may determine one or more actions associated with the group and cause an agent on the new resource to perform the action(s) to bring the new resource into the intended state associated with the group. Examples of such actions may include domain-joining an instance, configuring log generation for an instance, and so on. By reaching the same intended state across a group of resources, the individual resources in the group may share a particular "personality" and may typically perform the same or similar roles, such as a group of web servers or a group of database servers. Group membership may be determined dynamically at runtime on any suitable basis. For example, administrators may assign tags to compute instances or use autoscaling groups to define group membership dynamically and thus bind the instances to various configurations at runtime. In prior approaches, when an instance is instantiated (e.g., in an autoscaling group), an administrator may be required to manually configure the instance. By reducing manual configuration tasks using the techniques described herein, administration of computing resources may be made more flexible and efficient.

Figure 1:
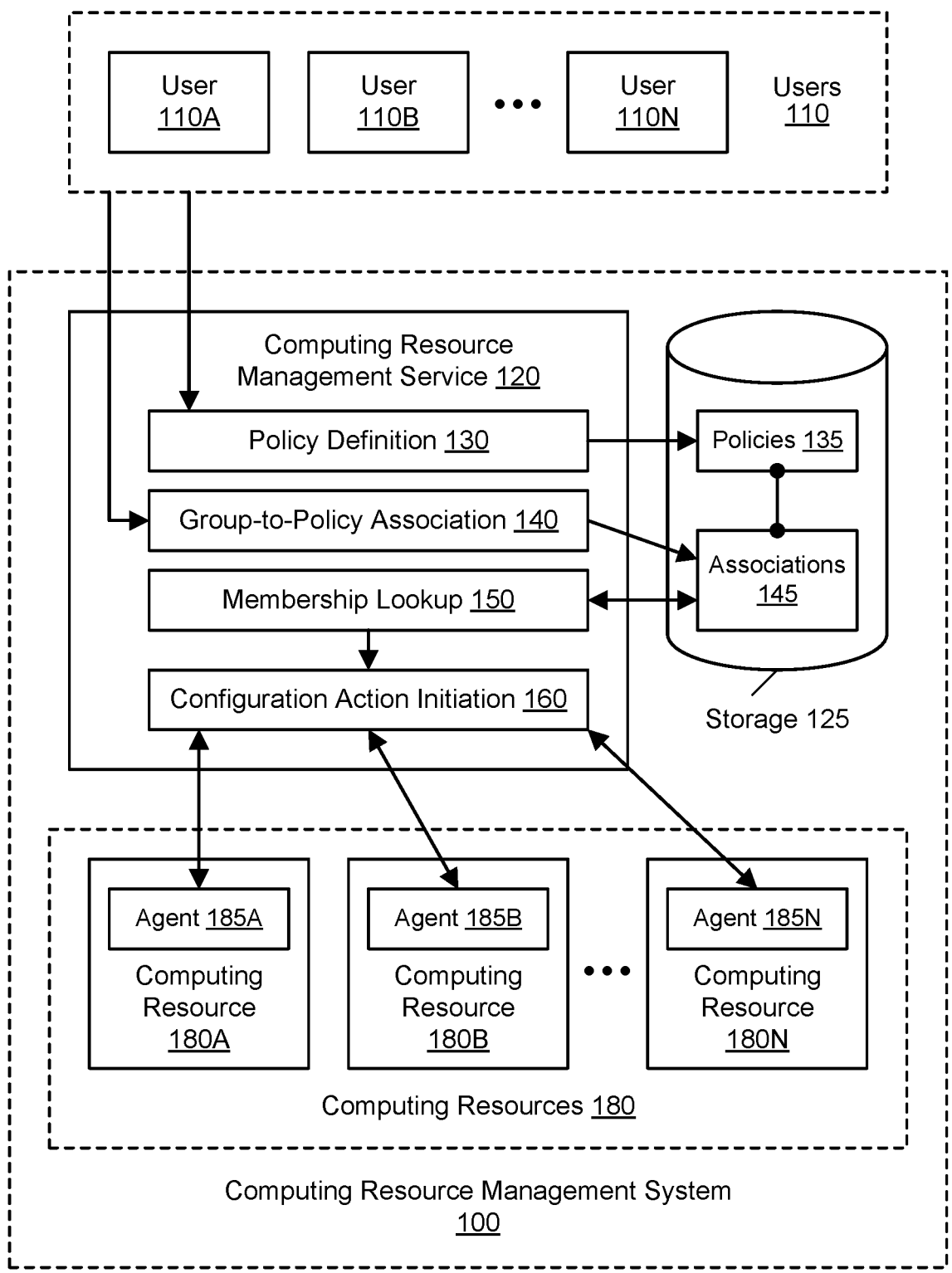
FIG. 1 illustrates an example system environment for resource configuration based on dynamic group membership, according to one embodiment.

FIG. 1 illustrates an example system environment for resource configuration based on dynamic group membership, according to one embodiment. A computing resource management system 100 may manage the configuration of various computing resources on behalf of clients of the system. In one embodiment, the computing resource management system 100 may include various computing resources 180 that may be automatically configured based on application of policies, such as computing resource 180A and computing resource 180B through computing resource 180N. However, it is contemplated that any suitable number and configuration of computing resources 180 may be automatically configured using the computing resource management system 100. The computing resources 180 may include any suitable computing devices, compute instances, or other resources that can be configured through automated application of policies, such as physical compute instances, virtual compute instances, storage instances, database instances, network devices, cell phones, mobile computing devices, home automation devices, wearable computing devices, and so on. The computing resources 180, when subject to automated configuration as described herein, may be referred to as managed resources or managed instances.

In one embodiment, the computing resource management system 100 may include a computing resource management service 120. The computing resource management service 120 may define and maintain policies that are usable to automatically configure the resources 180. In one embodiment, the computing resource management service 120 may include a functionality for policy definition 130. Using the functionality for policy definition 130, the computing resource management service 120 may define and store one or more policies 135. Policies 135 may represent intended states, also referred to herein as states or policy states. The policies 135 may be stored in persistent storage 125 that is managed by or accessible to the service 120. An intended state may represent a configuration of a computing resource such as a compute instance. A policy may include, reference, or otherwise be associated with one or more actions associated with such a configuration. For example, the policy may include or reference a set of instructions that, when executed or implemented, are expected to place the target resource into the intended state. Examples of such instructions may include instructions to domain-join an instance, instructions to configure log generation for an instance, and so on. The policies 135 may be defined or otherwise generated based (at least in part) on input from one or more users, e.g., one or more administrators with sufficient privileges with respect to the service 120 and/or resources 180.

In one embodiment, the computing resource management service 120 may include a functionality for group-to-policy association 140. Using the functionality for group-to-policy association 140, the computing resource management service 120 may create and store one or more associations 145 between groups of computing resources and policies. The associations 145 may be stored in the persistent storage 125 that is managed by or accessible to the service 120. An association may bind a group of computing resources to a particular policy or intended state. Membership in the group may be defined based on one or more membership criteria and dynamically evaluated at runtime. A stored association may include a reference to a particular policy along with one or more indicators of the membership criteria for a group (e.g., one or more tags, an identifier of an autoscaling group, and so on). In one embodiment, a stored association may also include data indicating how often to reapply the actions associated with the group, e.g., every hour, every day, never, and so on. By associating the same intended state across a group of resources, the individual resources in the group may share a particular "personality." The resources in a group may typically perform the same or similar roles, such as a group of web servers or a group of database servers, using the shared configuration associated with the intended state. The associations 145 may be defined or otherwise generated based (at least in part) on input from one or more users, e.g., one or more administrators with sufficient privileges with respect to the service 120 and/or resources 180.

Group membership and the corresponding membership criteria may be defined on any suitable basis. For example, a group may be associated with one or more tags, where the tags may include alphanumeric or textual labels, and resources labeled with those tag(s) may be deemed to be members of the group on a dynamic basis at the time when group membership is evaluated. The tags may be descriptive or arbitrary. For example, a tag of "[username]'s web servers" may represent a membership criterion for a group of web servers managed by [username]. Other dynamic constructs, such as autoscaling groups, may also be used to determine group membership dynamically. In one embodiment, specific resources (e.g., compute instances) may also be assigned to a group statically using their resource identifiers.

In one example use case, a client organization may have tens of thousands of desktop computing devices, and they may want to ensure that these devices are compliant with a company security standard. An administrator may create a policy named "Security-Compliant" that includes one or more actions to ensure compliance with the company security standard. The same or a different administrator may tag these desktop devices as "corp-desktop." The same or a different administrator may create an association between a policy named "Security-Compliant" with membership criteria "Key=tag:company,values=corp-desktop" in order to dynamically bind the desktops to the "Security-Compliant" policy whenever they are launched.

In one embodiment, the computing resource management service 120 may include a functionality for membership lookup 150. Using the functionality for membership lookup 150, the computing resource management service 120 may determine any groups to which a particular computing resource belongs. Whether a computing resource belongs to any group of computing resources may be determined based (at least in part) on automated analysis of one or more attributes associated with the computing resource in comparison to the membership criteria for the group(s). For example, the attribute(s) of the new computing resource may include one or more tags that are compared to one or more tags representing membership criteria for a group. As another example, the attribute(s) of the new computing resource may include an affiliation with an autoscaling group (representing a group of resources whose group size is determined dynamically based on computing needs) that also represents membership criteria for a group. As yet another example, a dynamic inventory query may be performed for the computing resource to determine whether its installed components and/or existing configuration qualifies it for membership in any groups. In one embodiment, a size of the group may be determined based (at least in part) as a percentage of a larger group, and membership of a particular resource may be determined (based at least in part) on that percentage. A particular resource may or may not be assigned to a particular subgroup of a larger group for purposes of applying a policy based on whether the subgroup is considered full, either by hitting a maximum number or by hitting a maximum percentage relative to the larger group.

In one embodiment, the functionality for membership lookup 150 may be invoked when the service 120 receives a request from a computing resource that has come online, e.g., from agent software on the resource. The analysis of group membership may be performed automatically and programmatically by the functionality for membership lookup 150 of the computing resource management service 120. The group membership may be determined dynamically, e.g., at runtime with respect to a computing resource. In one embodiment, the automated analysis of group membership may be performed in response to or based (at least in part) on the launching or instantiation of a computing resource. In one embodiment, the automated analysis of group membership may be performed upon or after the launching or instantiation of a computing resource, e.g., immediately prior to the launching or instantiation or after the launching or instantiation. In one embodiment, the automated analysis of group membership may be performed at any point during the operation of a computing resource. If a computing resource is not determined to be part of any groups based (at least in part) on the automated analysis of group membership, then the client may be responsible for further configuration (e.g., manual configuration) of the resource.

If a particular computing resource is determined to be a member of a particular group, then that group may be bound to a policy that includes a set of one or more actions to be attempted for the resource. The actions, or instructions representing the actions, may be retrieved from any suitable location, such as the storage 125, by a component of the service 120. In one embodiment, the computing resource management service 120 may include a functionality for configuration action initiation 160. Using the functionality for configuration action initiation 160, the computing resource management service 120 may cause one or more actions to be performed to bring (or attempt to bring) a computing resource to the intended state bound to the resource's group. After retrieving the appropriate instructions for a computing resource, the computing resource management service 120 may use the functionality for configuration action initiation 160 to send the instructions to the resource for attempted execution.

The computing resource management service 120 may also interact with agent software installed on the resources 180 to cause the resources to reach intended states associated with stored policies. As shown in the example of FIG. 1, agent software such as agent 185A on computing resource 180A, agent 185B on computing resource 180B, and agent 185N on computing resource 180N may be installed prior to use of the computing resources with the computing resource management service 120. The agents 185A-185N may represent the same or different sets of program code, depending upon the platforms used to implement the corresponding resources 180A-180N. However, the agents 185A-185N may typically offer the same functionality across the resources 180A-180N. The agents 185A-185N may interact with the computing resource management service 120 through any appropriate interface(s), potentially including one or more application programming interfaces (APIs) or other programmatic interfaces offered by the service. One of the agents 185A-185N may provide any required information, such as an instance identifier for the corresponding resource, a user account for the corresponding resource, and/or resource attributes (e.g., tags) relevant to membership criteria to the computing resource management service 120; receive instructions for the one or more actions to be performed to bring the resource to the intended state bound to the resource's group; and perform or implement the instructions to attempt to bring the resource to the intended state. The agents 185A-185N may also report, to the computing resource management service 120, the success or failure of the actions provided by the computing resource management service 120.

Clients of the computing resource management system 100 may be represented by a set of users 110. As shown for purposes of illustration and example, users such as user 110A and user 110B through user 110N may interact with the computing resource management system 100. However, it is contemplated that any suitable number and configuration of users 110 may interact with the computing resource management system 100. The users 110 may represent individual or organizational accounts that have sufficient privileges to invoke the functionality of the computing resource management system 100, e.g., to define policies and/or associate groups with policies. The users 110 may represent administrators of the resources 180. The user input for defining the intended states and/or creating associations may be received by a suitable component of the computing resource management system 100, such as a management console that includes a graphical user interface (GUI) or command-line interface (CLI). As shown in FIG. 1, the users 110 may represent computing devices, any of which may be implemented by the example computing device 3000 illustrated in FIG. 8, that are operated by individual users. The devices operated by the users 110 may be communicatively coupled to the computing resource management system 100, e.g., via one or more networks. The users 110 may represent internal clients of the computing resource management system 100 (e.g., users within the same organization as the system) or external clients (e.g., users outside the organization that operates the system).

Figure 8:
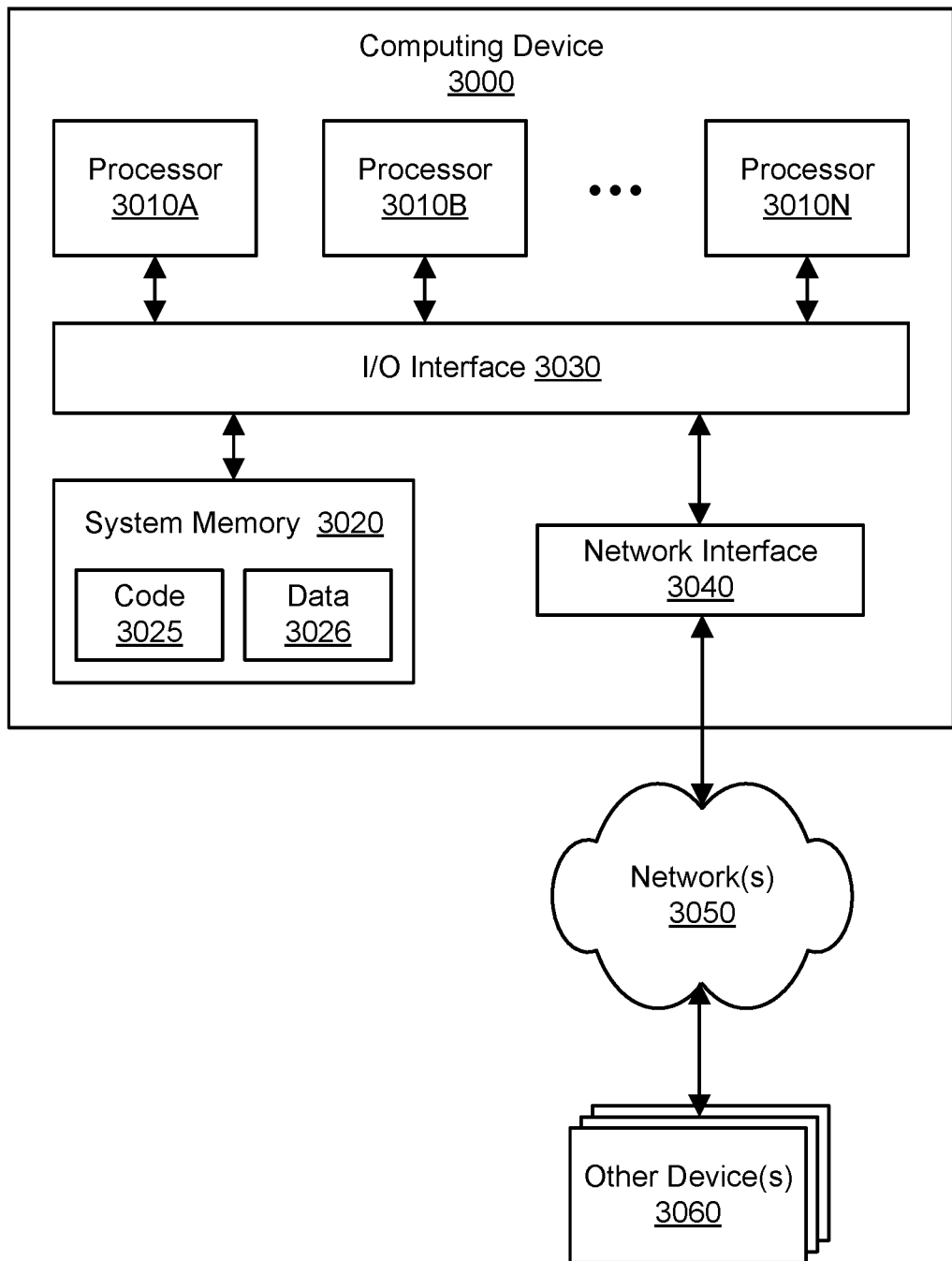
FIG. 8 illustrates an example computing device that may be used in some embodiments.

The computing resource management system 100 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the computing resource management system 100 may be provided by the same computing device or by different computing devices. If any of the components of the computing resource management system 100 are implemented using different computing devices, then the components and their respective computing devices may be communicatively coupled, e.g., via one or more networks. Each of the components of the computing resource management system 100 may represent any combination of software and hardware usable to perform their respective functions, as discussed as follows. Operations implemented by the computing resource management system 100 may be performed automatically, e.g., without a need for user initiation or user intervention after an initial configuration stage, and programmatically, e.g., by execution of program instructions on at least one computing device. It is contemplated that the computing resource management system 100 may include additional components not shown, fewer components than shown, or different combinations, configurations, or quantities of the components shown.

The computing resource management service 120 may be implemented in a service-oriented system in which multiple services collaborate according to a service-oriented architecture. In such an environment, the computing resource management service may offer its functionality to multiple clients. Clients of the service 120, such as agents 185A-

185N and/or user devices 110A-110N, may convey network-based service requests to the computing resource management service via one or more networks. In various embodiments, the network(s) may encompass any suitable combination of networking hardware and protocols necessary to establish network-based communications between client devices and the computing resource management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the computing resource management system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the computing resource management system 100. It is noted that in some embodiments, client devices may communicate with the computing resource management system 100 using a private network rather than the public Internet.

Figure 2:
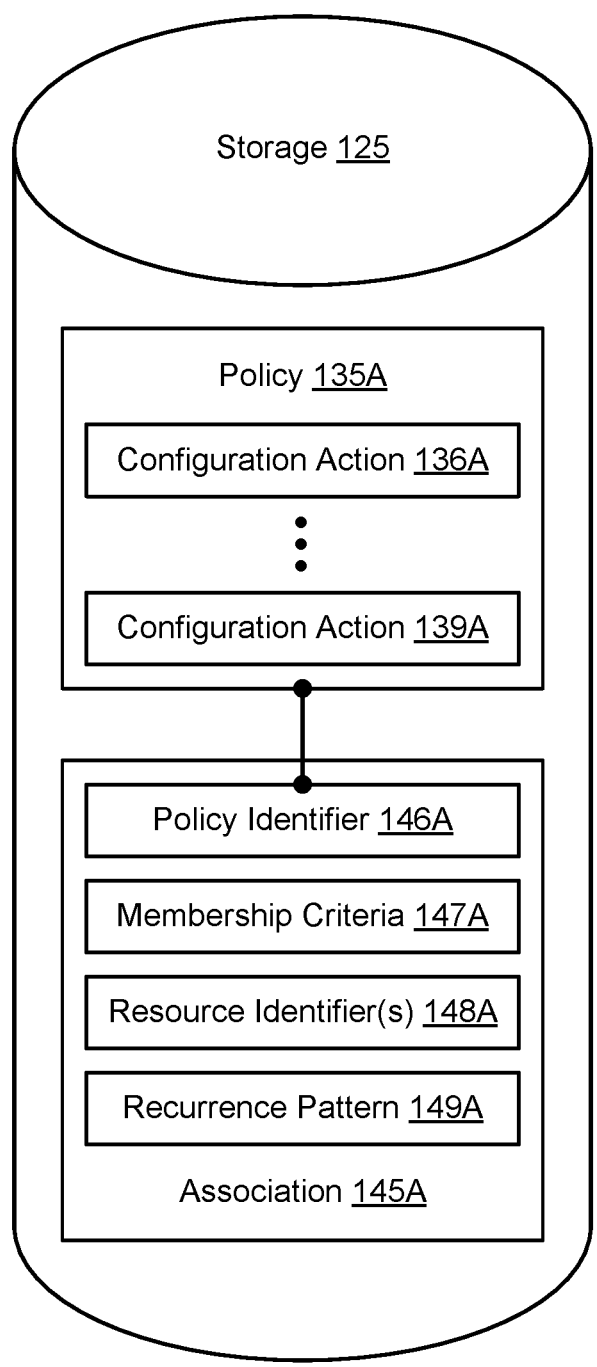
FIG. 2 illustrates an example of a group-to-policy association usable for resource configuration based on dynamic group membership, according to one embodiment.

FIG. 2 illustrates an example of a group-to-policy association usable for resource configuration based on dynamic group membership, according to one embodiment. An association 145A may bind a group of computing resources to a particular policy 135A and the corresponding intended state. The association 145A may include a reference 146A to a stored policy 135A. The policy 135A may correspond to a particular document in the persistent storage 125. The document may be expressed in any suitable format, e.g., JSON (JavaScript Object Notation). As shown for purposes of illustration and example, the policy 135A may include a set of configuration actions such as action 136A through action 139A. However, it is contemplated that a policy may include any suitable number and configuration of such actions. Each of the actions 136A-139A may also correspond to one or more instructions that are executable on a target resource, e.g., by agent software on that resource. Examples of such instructions may include instructions to domain-join an instance, instructions to configure log generation for an instance, and so on. An example of a "personality" associated with the policy 135A may include a configuration of a web server, and the actions 136A-139A may include installing web server software, installing antivirus software, configuring firewall ports, configuring alarms for performance monitoring, and so on.

In one embodiment, the policy 135A may be a parent of another policy and/or a child of another policy in a hierarchical structure of policies. Policies in such a hierarchical structure may inherit actions from parents. In one embodiment, a group and its constituent resources may be associated with more than one policy. Multiple policies bound to the same group may be applied in an order of precedence based on their relative positions in the hierarchy. For example, a more specific "child" policy may be applied after a more generic "parent" policy for the same computing resource.

Membership in the group associated with the policy 135A may be defined based on one or more membership criteria and dynamically evaluated at runtime. The association 145A may include one or more membership criteria 147A for a group of computing resources. Group membership and the corresponding membership criteria may be defined on any suitable basis. For example, the membership criteria 147A may include one or more tags, where the tags may include alphanumeric or textual labels, and resources labeled with those tag(s) may be deemed to be members of the group on a dynamic basis at the time when group membership is evaluated. The tags may be descriptive or arbitrary. For example, a tag of "[username]'s web servers" may represent a membership criterion for a group of web servers managed by [username]. As a further example, one potential tag name may be "OperatingSystem," and tag values for that tag name may include specific families of operating systems. Another tag name may be "Role," and tag values for that tag name may include "FrontEnd," "Application," "Storage," and so on. Yet another tag name may be "Department," and tag values for that tag name may include "Finance," "HR," "Marketing," and so on. The membership criteria for a group may include one or more values for one tag name or for multiple tag names. The membership criteria may use Boolean operators such as AND and OR to represent complex conditions for group membership.

Other dynamic constructs, such as autoscaling groups whose size may be determined dynamically based on computing needs, may also be used to determine group membership dynamically. In one embodiment, the membership criteria 147A may include an identifier for such an autoscaling group or other dynamic construct, such as a virtual private cloud (VPC). In one embodiment, one or more specific resources (e.g., compute instances) may also be assigned to a group statically using their resource identifier(s) 148A, in which case the association 145A may include the specific resource identifiers. A group may include either or both of the statically and dynamically assigned computing resources.

In one embodiment, the association 145A may also include a recurrence pattern 149A. The recurrence pattern 149A may indicate how often to reapply the actions associated with the group, e.g., every hour, every day, never, and so on. In one embodiment, the agent on a computing resource may ask the service 120 for current instructions on a periodic basis based (at least in part) on the recurrence pattern 149A. Upon receiving such a request from the agent, the service 120 may dynamically evaluate the group membership for the resource at the current time (potentially using information cached at the service), determine the actions associated with the group to which the resource belongs, and send the actions (or the corresponding instructions) to the agent for execution. If the group membership has not changed, and the group remains bound to the policy, then the actions associated with that policy may be implemented on a recurring basis to ensure that the computing resource is kept in the intended state. In some circumstances, reapplying the actions in a policy may result in overriding a deviation from the intended state that has arisen in the intervening period. A deviation from the intended state may include any change in configuration, such as a change in the installed software inventory, parameter values, or other resource configuration settings, that may cause the resource to operate differently than in the intended state. Overriding the deviation may include restoring the computing resource to the intended state.

If the resource is no longer in the group (e.g., its tags have changed), or the group has been disassociated from the policy, then the actions associated with that group may potentially be automatically reverted by the agent, e.g., to uninstall any software or revert the resource to an earlier configuration. In one embodiment, reverting the prior actions may include wiping the existing configuration and/or restoring a default or initial configuration. If the resource is now in a different group (e.g., its tags have changed), then the actions associated with a policy bound to the different group may be sent to the agent for execution to bring the resource to a different intended state. In one embodiment, the association 145A may store access credentials that may be required to perform any of the actions 136A-139A on behalf of particular user accounts. The access credentials may be stored in an encrypted manner.

Figure 3:
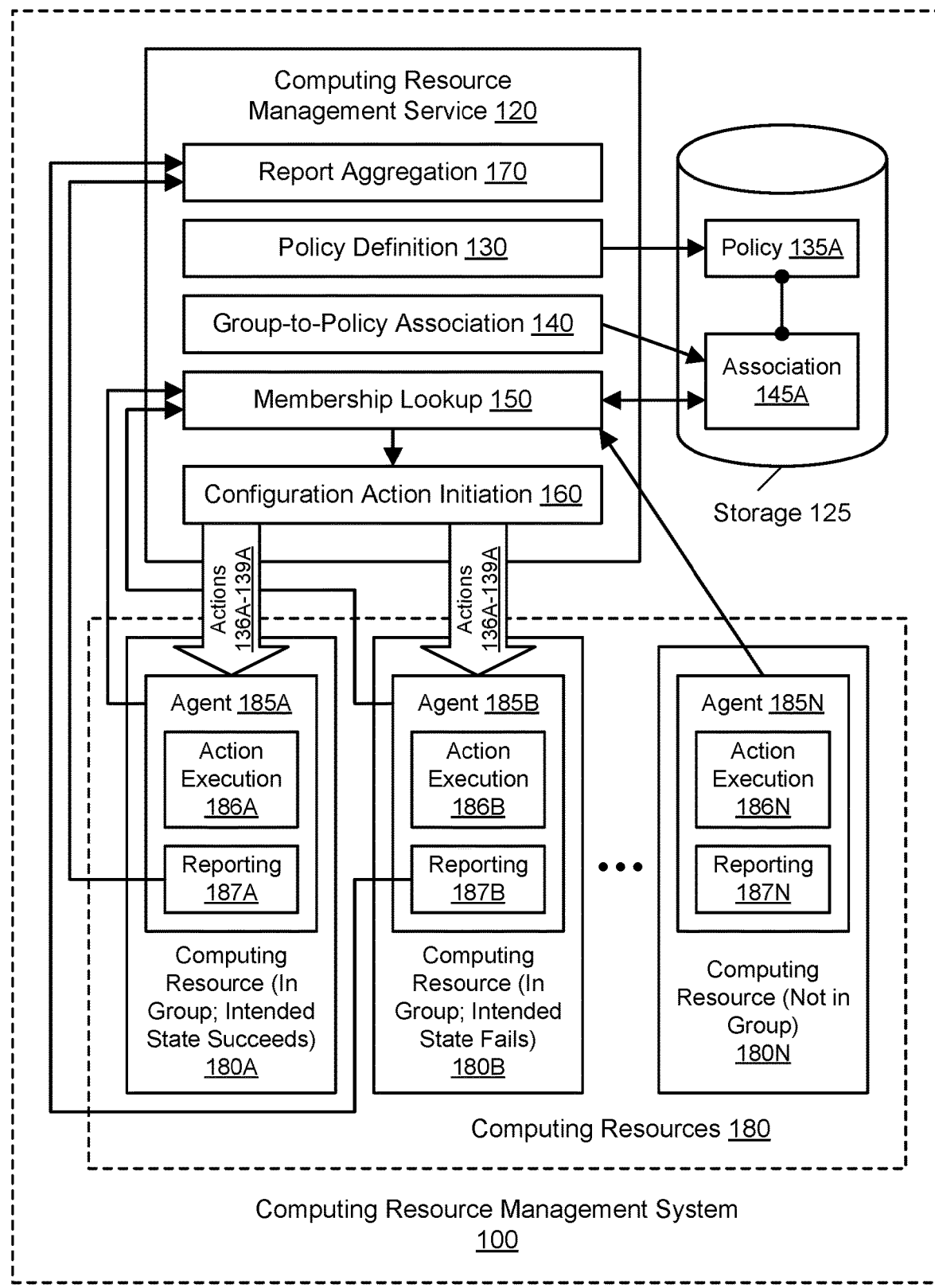
FIG. 3 illustrates further aspects of the example system environment for resource configuration based on dynamic group membership, including automated application of one or more actions to reach an intended state, according to one embodiment.

FIG. 3 illustrates further aspects of the example system environment for resource configuration based on dynamic group membership, including automated application of one or more actions to reach an intended state, according to one embodiment. As discussed above with respect to FIG. 1 and FIG. 2, the membership lookup 150 may be performed for computing resources 180 when they launch, e.g., in response to requests issued by agents on the resources. As a result of the membership lookup 150, the computing resources 180A and 180B may be determined to be members of a particular group defined by membership criteria 147A and dynamically bound to a policy 135A by an association 145A. However, the computing resource 180N may not meet the membership criteria 147A for the particular group. Upon determining the membership of resources 180A and 180B in the group, the computing resource management service 120 may send the associated actions 136A-139A (or corresponding executable instructions) to the agents 185A and 185B. In one embodiment, the computing resource management service 120 may also send any other relevant updates, such as changes in the recurrence pattern or other policy-based changes, to the agents 185A and 185B.

Using their respective action execution components 186A and 186B, the agents 185A and 185B may then attempt to implement the actions on their corresponding resources to reach the intended state of the policy 135A. In one embodiment, the agent 185A may succeed in implementing the actions 136A-139A for resource 180A, such that resource 180A may be successfully placed in the intended state. The agent 185A may then report its success back to a report aggregation component 170 of the service 120 for record-keeping purposes using its reporting component 187A. However, the agent 185B may fail in implementing the actions 136A-139A for resource 180B, such that resource 180B may not be placed in the intended state. The agent 185B may then report its failure back to the report aggregation component 170 of the service 120 for record-keeping purposes using its reporting component 187B. Using the report aggregation component 170, the service 120 may report the success or failure of attempts to enforce policies on a per-resource and/or per-group basis, e.g., as a percentage of successful or failed attempts for a group. The report aggregation component 170 may also report (e.g., to the users 110) any other status information relevant to the system 100.

In one embodiment, a computing resource may belong to two or more groups when the group membership is dynamically evaluated. For example, a particular computing resource may belong to a first group and a second group. The first group may be bound to a first policy that has a first intended state and set of actions. The second group may be bound to a second policy that has a second intended state and set of actions. In one embodiment, the actions for both the first and second policies may be performed with respect to the computing resource. In one embodiment, the service 120 may reconcile any potentially competing or contradictory actions before sending them to the computing resources. In one embodiment, an order of precedence may be established such that a more important policy may be implemented after a less important policy in case any of the actions conflict. The order of precedence may be determined on any suitable basis. For example, if the resource is statically bound by its resource identifier to the first group but dynamically bound by a tag to the second group, then the first group and corresponding first policy may be deemed more important and performed later. As another example, the order of precedence may be based (at least in part) on a hierarchy of groups, such that the actions may be performed later for a more specific group lower in the hierarchy.

Figure 4:
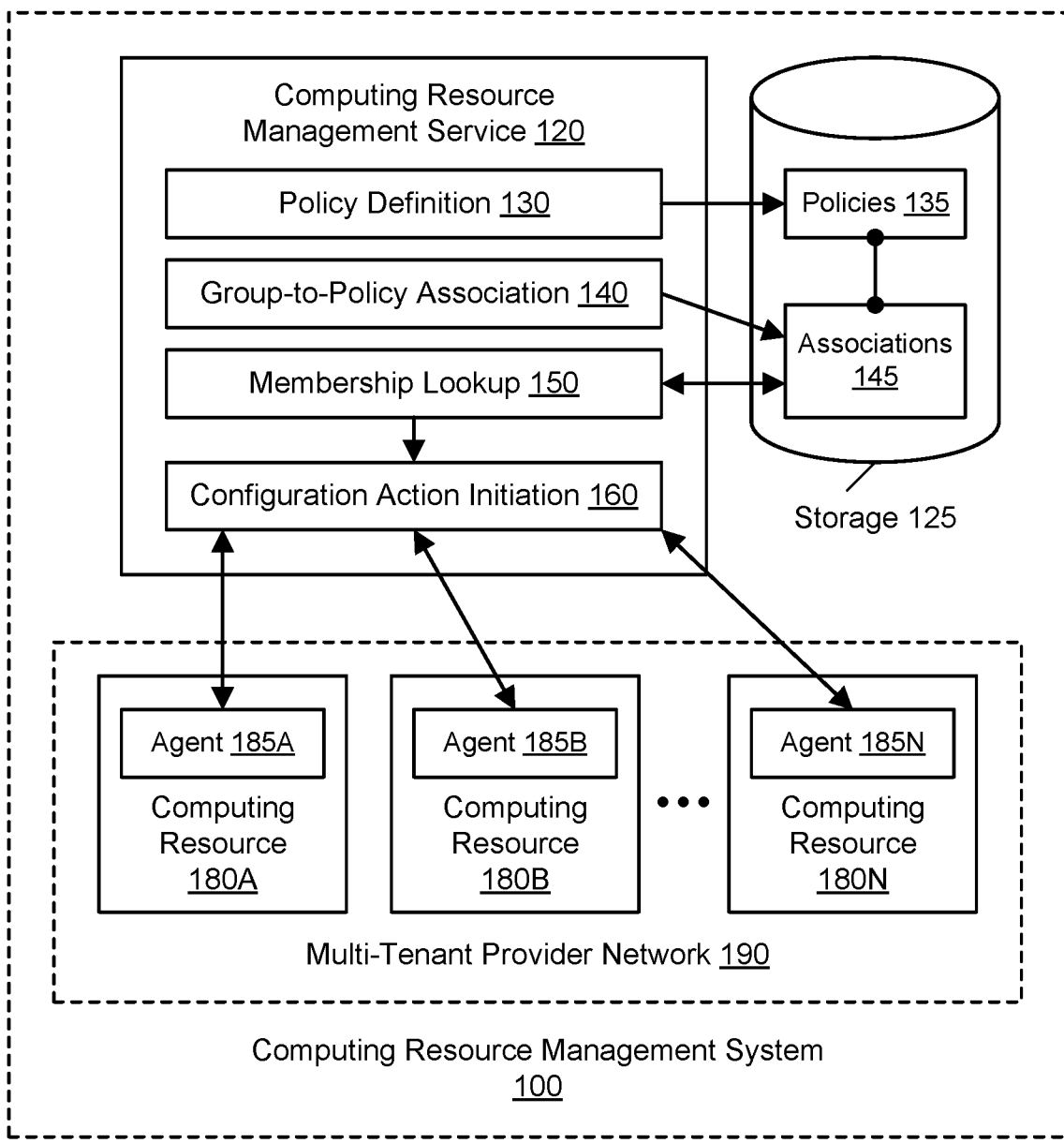
FIG. 4 illustrates further aspects of the example system environment for resource configuration based on dynamic group membership, including automated configuration of computing resources provisioned from a multi-tenant provider network, according to one embodiment.

FIG. 4 illustrates further aspects of the example system environment for resource configuration based on dynamic group membership, including automated configuration of computing resources provisioned from a multi-tenant provider network, according to one embodiment. In one embodiment, aspects of the computing resource management service 120 and/or computing resource management system 100 may be implemented using computing resources 180A-180N of a provider network 190. A provider network 190 may represent a network set up by an entity such as a company or a public sector organization to provide one or more services (such as various types of network-accessible computing or storage) accessible via the Internet and/or other networks to a distributed set of clients. A provider network 190 may include numerous data centers hosting various resource pools, such as collections of physical and/or virtualized computer servers, storage devices, networking equipment and the like, that are used to implement and distribute the infrastructure and services offered by the provider. The computing resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network.

In some embodiments, an operator of the provider network 190 may implement a flexible set of resource reservation, control, and access interfaces for their clients. For example, a resource manager component may implement a programmatic resource reservation interface (e.g., via a web site or a set of web pages) that allows clients (potentially including other components within the provider network) to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on.

The provider network 190 may support several different purchasing modes (which may also be referred to herein as reservation modes) in one embodiment: for example, long-term reservations, on-demand resource allocation, or spotprice-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 5:
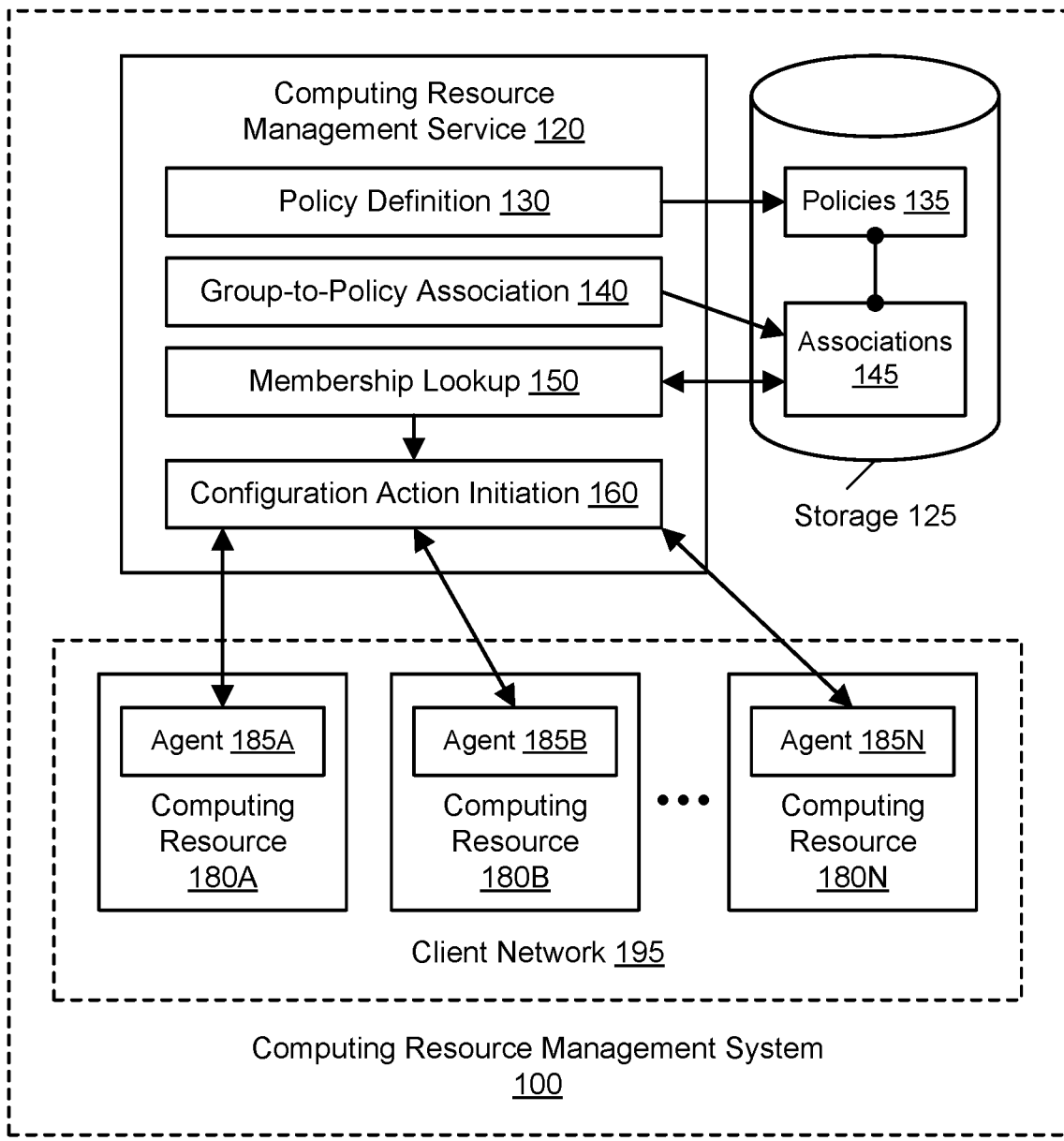
FIG. 5 illustrates further aspects of the example system environment for resource configuration based on dynamic group membership, including automated configuration of computing resources in a client-operated network, according to one embodiment.

FIG. 5 illustrates further aspects of the example system environment for resource configuration based on dynamic group membership, including automated configuration of computing resources in a client-operated network, according to one embodiment. In one embodiment, aspects of the computing resource management service 120 and/or computing resource management system 100 may be implemented using computing resources 180A-180N of a client network 195. The client network 195 may represent resources 180A-180N owned and/or operated by an external organization with respect to the organization that provides the service 120. The client network 195 may be located on different premises (e.g., client premises) than the devices that implement the service 120. The client organization may have an agreement in place to pay fees for use of the service 120. The agent software 185A-185N may be provided by the organization associated with the service 120 to be executed within the client network 195.

Figure 6:
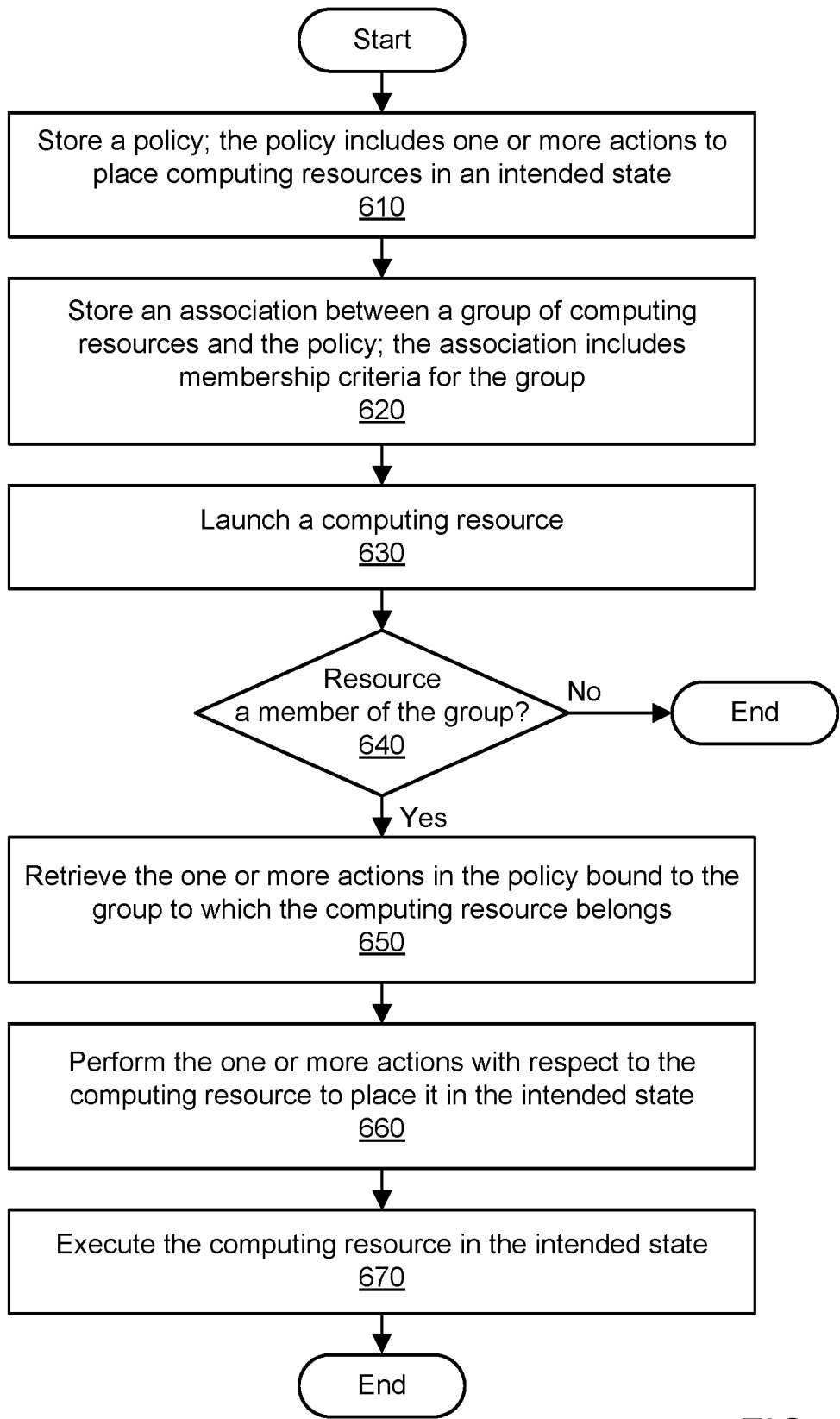
FIG. 6 is a flowchart illustrating a method for resource configuration based on dynamic group membership, according to one embodiment.

FIG. 6 is a flowchart illustrating a method for resource configuration based on dynamic group membership, according to one embodiment. As shown in 610, a policy with a corresponding intended state may be stored. The intended state may represent a configuration of a computing resource such as a compute instance. The policy may include, reference, or otherwise be associated with one or more actions. For example, the policy may include or reference a set of instructions that, when executed or implemented, are expected to put the target resource into the intended state. Examples of such instructions may include instructions to domain-join an instance, instructions to configure log generation for an instance, and so on. The policy may be defined or otherwise generated based (at least in part) on input from a user, e.g., an administrator with sufficient privileges within a system. The user input for defining the policy may be received by a suitable component of a computing resource management system, such as a management console that includes a graphical user interface (GUI) or command-line interface (CLI). The policy may be stored in storage managed by or otherwise accessible to a component of the computing resource management system, such as a computing resource management service that takes part in runtime, dynamic configuration of resources.

As shown in 620, an association may be stored that binds a group of computing resources to the policy and its intended state. Membership in the group may be defined based on one or more membership criteria. For example, a group may be associated with one or more tags, where the tags may include alphanumeric or textual labels, and resources labeled with those tag(s) may be deemed to be members of the group on a dynamic basis at the time when group membership is evaluated. The tags may be descriptive or arbitrary. For example, a tag of "[username]'s web servers" may represent a membership criterion for a group of web servers managed by [username]. In one embodiment, specific resources (e.g., compute instances) may also be assigned to a group statically using their resource identifiers. A stored association may include a reference to an intended state (also referred to as a policy state) along with one or more indicators of the membership criteria for a group (e.g., one or more tags, an identifier of an autoscaling group, and so on). In one embodiment, a stored association may also include data indicating how often to reapply the actions associated with the group, e.g., every hour, every day, never, and so on. By associating the same intended state across a group of resources, the individual resources in the group may share a particular "personality." The resources in a group may typically perform the same or similar roles, such as a group of web servers or a group of database servers, using the shared configuration associated with the intended state.

As shown in 630, a computing resource such as a compute instance may be launched or instantiated. The terms "launch" and "instantiate" may be used synonymously herein. Launching or instantiating the resource may include booting or otherwise initiating functionality of the resource. In one embodiment, the resource may be provisioned on behalf of a client from a pool of resources of a multi-tenant provider network, and the launching or instantiating may be associated with the provisioning. In one embodiment, the resource may instead be part of a set of resources available to a single client, e.g., to users with sufficient privileges within a single organization. The resource may be configured with agent software associated with the computing resource management system. The agent software may be pre-installed on the resource or installed shortly after launch. The agent software may be installed on resources provisioned from a multi-tenant provider network and also on resources within a single-client network (e.g., a set of resources on client premises that are generally available only to users within a client organization) that are sought to be managed using the computing resource management system. The launched or instantiated computing resource may be referred to as a new computing resource (or new compute instance), even if the resource has previously been used, or as a target computing resource (or target compute instance). Upon launch or instantiation, agent software on the computing resource may communicate with the computing resource management service to request any executable actions associated with any policies bound to any groups to which the resource belongs. In one embodiment, the operation shown in 630 may be performed before the operations shown in 610 and/or 620, e.g., such that new or updated policies and/or associations may be applied to instances that are already launched and running. In one embodiment, the agent software on the computing resource may communicate with the computing resource management service to request actions based on group affiliation at any suitable point in time during the life of the resource.

As shown in 640, the group membership, if any, of the new computing resource may be determined. Whether the new computing resource belongs to any group of computing resources may be determined based (at least in part) on automated analysis of one or more attributes associated with the new computing resource in comparison to the membership criteria for the group(s). For example, the attribute(s) of the new computing resource may include one or more tags that are compared to one or more tags representing membership criteria for the group defined in 620. As another example, the attribute(s) of the new computing resource may include an affiliation with an autoscaling group (representing a group of resources whose group size is determined dynamically based on computing needs) that also represents membership criteria for the group defined in 620. As yet another example, a size of the group may be determined based (at least in part) as a percentage of a larger group, and membership of a particular resource may be determined (based at least in part) on that percentage. The automated analysis of group membership may be performed automatically and programmatically by a component such as the computing resource management service. The group membership may be determined dynamically, e.g., at runtime with respect to the new computing resource. In one embodiment, the automated analysis of group membership may be performed in response to or based (at least in part) on the launching or instantiation of the new computing resource. In one embodiment, the automated analysis of group membership may be performed upon or after the launching or instantiation of a computing resource, e.g., immediately prior to the launching or instantiation or after the launching or instantiation. In one embodiment, the automated analysis of group membership may be performed at any suitable point during the life of the computing resource, e.g., as prompted by agent software on the resource. If the new computing resource is not determined to be part of any groups based (at least in part) on the automated analysis of group membership, then the method may end, and the client may be responsible for further configuration (e.g., manual configuration) of the resource.

As shown in 650, based (at least in part) on determining that the new computing resource belongs to the group defined in 620, one or more actions may be retrieved that are executable to reach the intended state bound to the group. As discussed above, the intended state bound to the group may include, reference, or otherwise be associated with one or more actions. For example, the intended state may include or reference a set of instructions that, when executed or implemented, are expected to put the target resource into the intended state. Examples of such instructions may include instructions to domain-join an instance, instructions to configure log generation for an instance, and so on. Such actions or instructions may be retrieved (e.g., from storage managed by or accessible to the computing resource management service) and sent to the new computing resource (e.g., from the computing resource management service to agent software installed on the resource).

As shown in 660, the one or more actions may be performed (or attempted) to bring the new computing resource into the intended state. In one embodiment, at least one of the actions may be performed by agent software on the new computing resource. Because the computing resource management service may send the action(s) to the agent, the service may be said to cause the action(s) to be performed. The success or failure of the action(s) may be reported by the agent to the computing resource management service, which may then present or maintain reporting data based (at least in part) on the success or failure of configuration of individual resources within a group and/or for the group as a whole (e.g., a percentage of resources in the group that were successfully configured to reach the intended state). By associating the same intended state across a group of resources, the individual resources in the group may share a particular "personality." The resources in a group may typically perform the same or similar roles, such as a group of web servers or a group of database servers, using the shared configuration associated with the intended state. As shown in 670, the new computing resource may be executed while having the compute instance configuration associated with the intended state.

Figure 7:
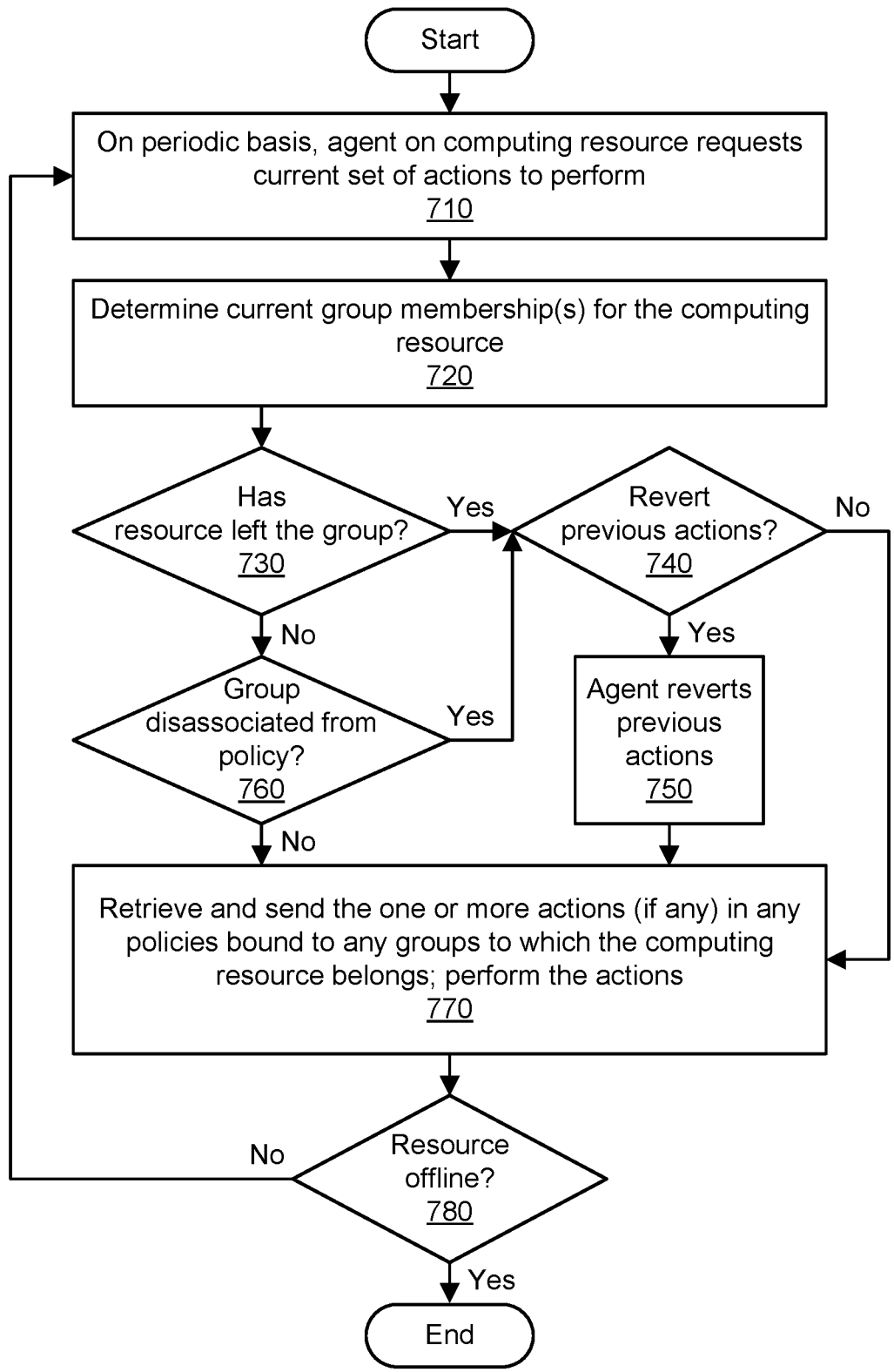
FIG. 7 is a flowchart illustrating a method for resource configuration based on dynamic group membership, including recurring automated application of one or more actions to reach or verify an intended state, according to one embodiment.

FIG. 7 is a flowchart illustrating a method for resource configuration based on dynamic group membership, including recurring automated application of one or more actions to reach or verify an intended state, according to one embodiment. The operation shown in 710 may be performed after the computing resource has been configured according to its dynamically evaluated group membership as shown in FIG. 6. As shown in 710, agent software on a computing resource may send a request to the computing resource management service for a current set of actions to be performed and potentially for any other updates in relevant policies and/or associations. The operation shown in 710 may be performed on a periodic and/or recurring basis, e.g., based on a recurrence pattern in the association that binds the group to the policy.

As shown in 720, the current group membership(s), if any, of the computing resource may be determined as discussed above with respect to 640. Whether the computing resource belongs to any group of computing resources may be determined based (at least in part) on automated analysis of one or more attributes associated with the computing resource in comparison to the membership criteria for the group(s). In one embodiment, the group membership for the computing resource may be cached by the computing resource management service in the operation shown in 640 and then retrieved from the cache to perform the operation shown in 720. The cached membership information may be invalidated if the resource leaves the group (e.g., its tags have changed) or if the group is disassociated from the policy.

As shown in 730, it may be determined whether the resource has left the group. For example, the resource may no longer be in the group if its tags have changed to no longer meet the membership criteria. As another example, the resource may no longer be in the group if the tags in the membership criteria have changed to exclude the resource. If the resource has left the group, then as shown in 740, it may be determined whether to revert the actions previously performed in 660. If so, then as shown in 750, the one or more actions may be reverted by the agent software, e.g., to uninstall one or more components or otherwise restore a prior configuration of the resource. In one embodiment, reverting the prior actions may include wiping the existing software configuration and/or restoring a default or initial software configuration.

If the resource remains in the group, then as shown in 760, it may be determined whether the group has been disassociated from the policy, typically by action of an administrator. If the association between the group and policy has been removed, then as shown in 740, it may be determined whether to revert the actions previously performed in 660. If so, then as shown in 750, the one or more actions may be reverted by the agent software, e.g., to uninstall one or more components or otherwise restore a prior configuration of the resource. In one embodiment, reverting the prior actions may include wiping the existing software configuration and/or restoring a default or initial software configuration.

As shown in 770, the one or more actions associated with any groups to which the resource currently belongs may be sent to the resource and performed (or attempted) to bring the computing resource into the intended state. In one embodiment, at least one of the actions may be performed by agent software on the new computing resource. If the resource remains in the group, the group remains associated with the policy, and the policy remains the same, then the same action(s) may be performed again to ensure that the resource is kept in the same intended state. If the resource is now bound to a different set of actions (e.g., if the group membership or group-to-policy association has changed), then a different set of actions may be performed to place the resource in a different intended state. As shown in 780, the method may return to 710 as long as the resource remains online with the agent installed and executing. In this manner, one or more policies may be "enforced" on a periodic and/or recurring basis throughout the life cycle of a computing resource.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories to store computer-executable instructions that, when executed, cause the one or more processors to:
send, from a computing resource to a computing resource management service, a query for one or more actions, wherein, during operation of the computing resource, the computing resource is determined to belong to a group of computing resources based at least in part on one or more attributes associated with the computing resource, and wherein the group of computing resources is associated with an intended state representing a computing resource configuration;
receive, by the computing resource from the computing resource management service, data indicative of the one or more actions, wherein the one or more actions are determined by the computing resource management service based at least in part on determining that the computing resource belongs to the group of computing resources; and
perform, by the computing resource, the one or more actions, wherein the one or more actions bring the computing resource into the intended state representing the computing resource configuration, and wherein the computing resource is executed while having the computing resource configuration of the intended state.

2. The system as recited in claim 1, wherein the one or more memories store additional computer-executable instructions that, when executed, cause the one or more processors to:
perform, by the computing resource, the one or more actions one or more additional times such that the intended state for the computing resource is maintained until the computing resource is terminated.

3. The system as recited in claim 1, wherein the one or more memories store additional computer-executable instructions that, when executed, cause the one or more processors to:
perform, by the computing resource, the one or more actions one or more additional times such that the intended state for the computing resource is maintained until the association between the group of computing resources and the intended state is removed.

4. The system as recited in claim 1, wherein at least one of the actions is performed by agent software on the computing resource, wherein the agent software queries the computing resource management service on a periodic basis to determine and reapply the one or more actions associated with the group to which the computing resource belongs, and wherein reapplying the one or more actions comprises overriding a deviation from the intended state.

5. The system as recited in claim 1, wherein, during operation of the computing resource, the computing resource is determined to belong to an additional group of computing resources based at least in part on the one or more attributes associated with the computing resource, wherein the additional group of computing resources is associated with an additional intended state representing a different computing resource configuration, and wherein the one or more memories store additional computer-executable instructions that, when executed, cause the one or more processors to:
receive, by the computing resource from the computing resource management service, data indicative of one or more additional actions, wherein the one or more additional actions are determined by the computing resource management service based at least in part on determining that the computing resource belongs to the additional group of computing resources; and
perform, by the computing resource, the one or more additional actions, wherein the one or more additional actions bring the computing resource into the additional intended state representing the different computing resource configuration, and wherein the computing resource is executed while having the different computing resource configuration of the additional intended state.

6. The system as recited in claim 5, wherein the one or more attributes are modified and the computing resource is determined to belong to the additional group of computing resources after the computing resource is brought into the intended state.

7. A computer-implemented method, comprising:
sending, from a computing resource to a computing resource management service, a query for one or more actions, wherein, during operation of the computing resource, the computing resource is determined to belong to a group of computing resources based at least in part on one or more attributes associated with the computing resource, and wherein the group of computing resources is associated with an intended state representing a computing resource configuration;
receiving, by the computing resource from the computing resource management service, data indicative of the one or more actions, wherein the one or more actions are determined by the computing resource management service based at least in part on determining that the computing resource belongs to the group of computing resources; and
performing, by the computing resource, the one or more actions, wherein the one or more actions bring the computing resource into the intended state representing the computing resource configuration, and wherein the computing resource is executed while having the computing resource configuration of the intended state.

8. The method as recited in claim 7, further comprising:
performing, by the computing resource, the one or more actions one or more additional times such that the intended state for the computing resource is maintained until the computing resource is terminated.

9. The method as recited in claim 7, further comprising:
performing, by the computing resource, the one or more actions one or more additional times such that the intended state for the computing resource is maintained until the association between the group of computing resources and the intended state is removed.

10. The method as recited in claim 7, wherein at least one of the actions is performed by agent software on the computing resource, wherein the agent software queries the computing resource management service on a periodic basis to determine and reapply the one or more actions associated with the group to which the computing resource belongs, and wherein reapplying the one or more actions comprises overriding a deviation from the intended state.

11. The method as recited in claim 7, wherein, during operation of the computing resource, the computing resource is determined to belong to an additional group of computing resources based at least in part on the one or more attributes associated with the computing resource, wherein the additional group of computing resources is associated with an additional intended state representing a different computing resource configuration, and wherein the method further comprises:
receiving, by the computing resource from the computing resource management service, data indicative of one or more additional actions, wherein the one or more additional actions are determined by the computing resource management service based at least in part on determining that the computing resource belongs to the additional group of computing resources; and
performing, by the computing resource, the one or more additional actions, wherein the one or more additional actions bring the computing resource into the additional intended state representing the different computing resource configuration, and wherein the computing resource is executed while having the different computing resource configuration of the additional intended state.

12. The method as recited in claim 11, wherein the one or more attributes are modified and the computing resource is determined to belong to the additional group of computing resources after the computing resource is brought into the intended state.

13. The method as recited in claim 7, wherein the association between the group of computing resources and the intended state is removed or the computing resource is removed from the group, and wherein the method further comprises:
receiving, by the computing resource from the computing resource management service, data indicative of reversion of the one or more actions; and
reverting, by the computing resource, the one or more actions, wherein reversion of the one or more actions brings the computing resource into a state preceding the intended state.

14. One or more non-transitory computer-readable storage media storing program instructions that, when executed on or across one or more processors, perform:
sending, from a computing resource to a computing resource management service, a query for one or more actions, wherein, during operation of the computing resource, the computing resource is determined to belong to a group of computing resources based at least in part on one or more attributes associated with the computing resource, and wherein the group of computing resources is associated with an intended state representing a computing resource configuration;
receiving, by the computing resource from the computing resource management service, data indicative of the one or more actions, wherein the one or more actions are determined by the computing resource management service based at least in part on determining that the computing resource belongs to the group of computing resources; and
performing, by the computing resource, the one or more actions, wherein the one or more actions bring the computing resource into the intended state representing the computing resource configuration, and wherein the computing resource is executed while having the computing resource configuration of the intended state.

15. The one or more non-transitory computer-readable storage media as recited in claim 14, further comprising additional program instructions that, when executed on or across the one or more processors, perform:
performing, by the computing resource, the one or more actions one or more additional times such that the intended state for the computing resource is maintained until the computing resource is terminated.

16. The one or more non-transitory computer-readable storage media as recited in claim 14, further comprising additional program instructions that, when executed on or across the one or more processors, perform:
performing, by the computing resource, the one or more actions one or more additional times such that the intended state for the computing resource is maintained until the association between the group of computing resources and the intended state is removed.

17. The one or more non-transitory computer-readable storage media as recited in claim 14, wherein at least one of the actions is performed by agent software on the computing resource, wherein the agent software queries the computing resource management service on a periodic basis to determine and reapply the one or more actions associated with the group to which the computing resource belongs, and wherein reapplying the one or more actions comprises overriding a deviation from the intended state.

18. The one or more non-transitory computer-readable storage media as recited in claim 14, wherein, during operation of the computing resource, the computing resource is determined to belong to an additional group of computing resources based at least in part on the one or more attributes associated with the computing resource, wherein the additional group of computing resources is associated with an additional intended state representing a different computing resource configuration, and wherein the one or more non-transitory computer-readable storage media further comprise additional program instructions that, when executed on or across the one or more processors, perform:

receiving, by the computing resource from the computing resource management service, data indicative of one or more additional actions, wherein the one or more additional actions are determined by the computing resource management service based at least in part on determining that the computing resource belongs to the additional group of computing resources; and performing, by the computing resource, the one or more additional actions, wherein the one or more additional actions bring the computing resource into the additional intended state representing the different computing resource configuration, and wherein the computing resource is executed while having the different computing resource configuration of the additional intended state.

19. The one or more non-transitory computer-readable storage media as recited in claim 18, wherein the one or more attributes are modified and the computing resource is determined to belong to the additional group of computing resources after the computing resource is brought into the intended state.

20. The one or more non-transitory computer-readable storage media as recited in claim 14, wherein the association between the group of computing resources and the intended state is removed or the computing resource is removed from the group, and wherein the one or more non-transitory computer-readable storage media further comprise additional program instructions that, when executed on or across the one or more processors, perform:

receiving, by the computing resource from the computing resource management service, data indicative of reversion of the one or more actions; and reverting, by the computing resource, the one or more actions, wherein reversion of the one or more actions brings the computing resource into a state preceding the intended state.

\* \* \* \* \*